Oct. 18, 1949.   C. E. SLAUGHTER   2,484,965
METHOD OF MAKING EXTRUDED COLLAPSIBLE TUBES
Filed Nov. 8, 1946   3 Sheets-Sheet 1
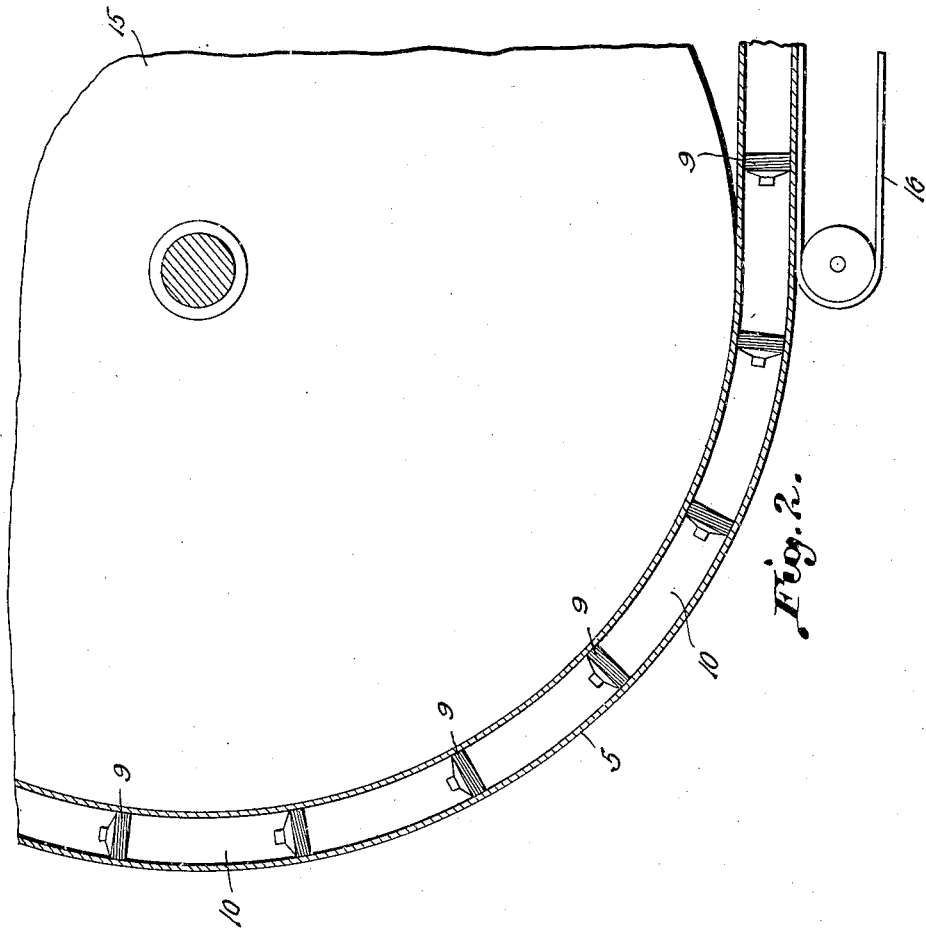
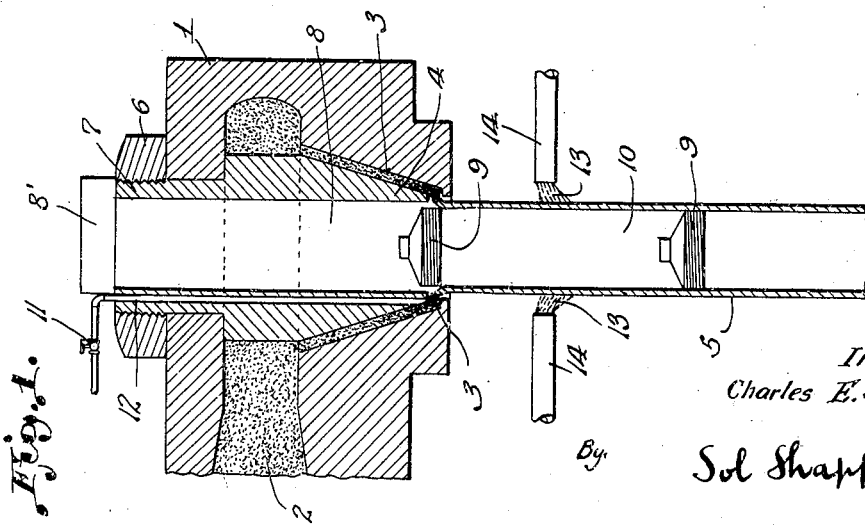
Inventor:
Charles E. Slaughter.
By Sol Shappiro
Attorney.

Oct. 18, 1949.  C. E. SLAUGHTER  2,484,965
METHOD OF MAKING EXTRUDED COLLAPSIBLE TUBES
Filed Nov. 8, 1946  3 Sheets-Sheet 2
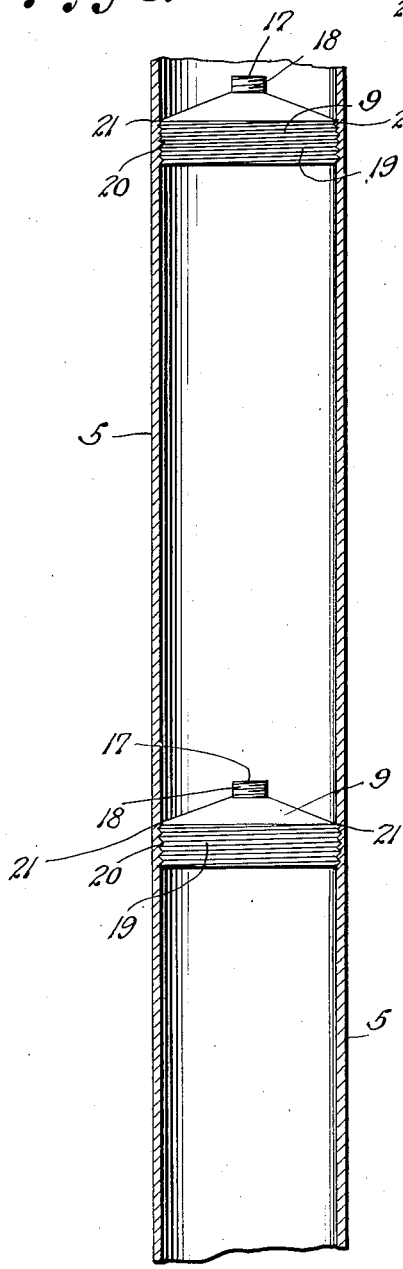
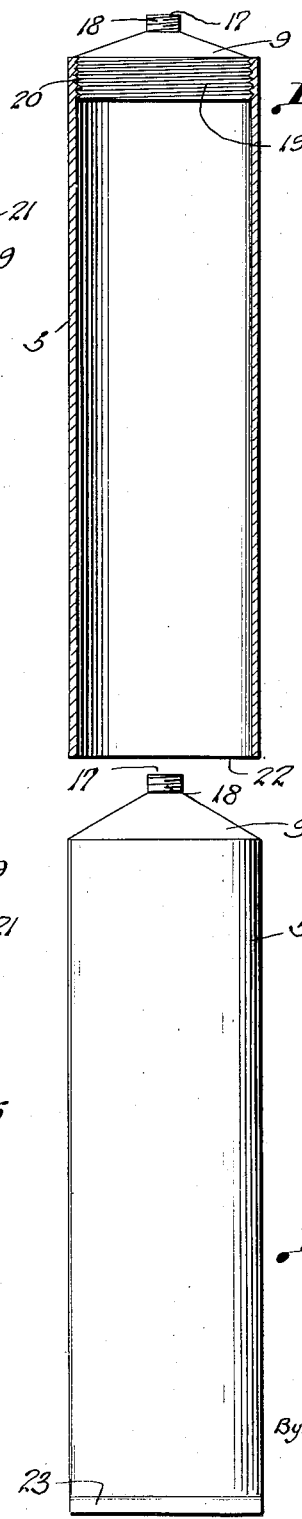
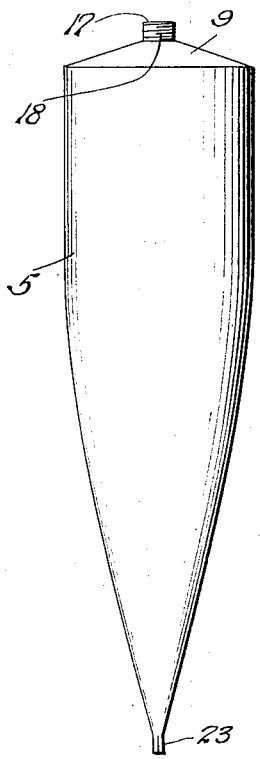
Inventor.
Charles E. Slaughter
By Sol Shappirio
Attorney.

Oct. 18, 1949.  C. E. SLAUGHTER  2,484,965
METHOD OF MAKING EXTRUDED COLLAPSIBLE TUBES
Filed Nov. 8, 1946  3 Sheets-Sheet 3
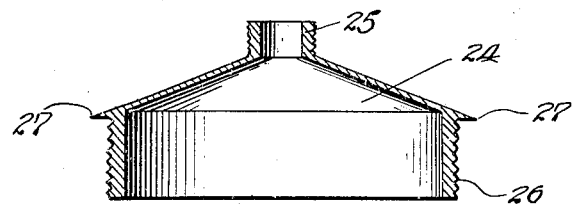
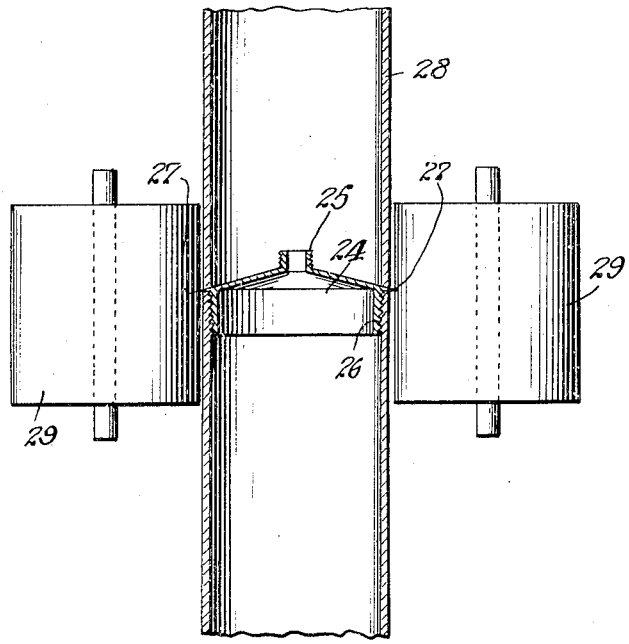
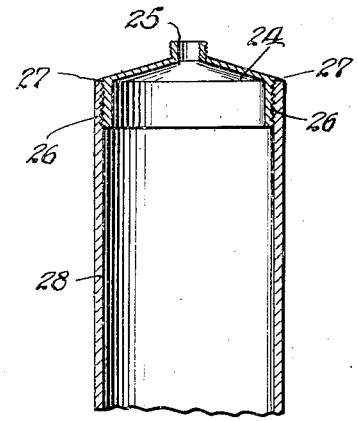
Inventor.
Charles E. Slaughter
By Sol Shappirio
Attorney.

Patented Oct. 18, 1949

2,484,965

UNITED STATES PATENT OFFICE 2,484,965

METHOD OF MAKING EXTRUDED COLLAPSIBLE TUBES

Charles E. Slaughter, New Canaan, Conn., assignor to Extruded Plastics, Inc., Norwalk, Conn., a corporation of Connecticut Application November 8, 1946, Serial No. 708,771

10 Claims. (Cl. 18—59)

This application is a continuation in part of my prior application 575,856, filed Feb. 2, 1945, which is now matured into Patent 2,452,607 as granted Nov. 2, 1948.

This invention relates to the production of articles from extruded thermoplastic tubing, and particularly to the production of collapsible tubes and to methods of making such articles.

The production of collapsible tubes for packaging of various paste type articles and other semi-fluid materials has been virtually limited to the production of such tubes from soft flexible metals like lead, lead-in alloys, etc. The production of such collapsible tubes from thermoplastic materials like the thermoplastic resins has not heretofore been possible.

Among the objects of the present invention is the production of collapsible tubes from thermoplastic materials.

Other objects include methods for producing such collapsible tubes and the tubes themselves.

Still further objects of the present invention will appear from the more detailed description set forth below, it being understood that such more detailed description is given by way of illustration and explanation only, and not by way of limitation, since various changes therein may be made by those skilled in the art without departing from the scope and spirit of the present invention.

In connection with that more detailed description, there is shown in the accompanying drawings, in Figure 1, a side elevation of a machine that may be utilized in carrying out the present invention, partly in section; in Figure 2, a side elevational view showing tubing as taken off of the apparatus of Figure 1; in Figure 3, a continuous length of extruded tubing carrying a series of closures therein in spaced relation one to the other; in Figure 4, a single element cut from the continuous tubing of Figure 3; in Figure 5, a finished collapsible tube produced in accordance with the present invention shown in front elevation; in Figure 6, the finished tube of Figure 5 in side elevation; in Figure 7, a transverse section through a modified form of closure end; in Figure 8, an elevation of cutting mechanism; and in Figure 9, a modified collapsible tube blank.

In accordance with the present invention, collapsible tubes are produced from thermoplastic tubing extruded from thermoplastic materials having the properties desired for the particular purposes in hand. And during the process of extrusion of such tubing, rigid closures are inserted within the extruded tubing as the latter is being extruded and while still hot from the extruding operation so that the closure is sealed to the tubing at its point of contact, the closures being fed desirably intermittently through the extrusion die into and within the tubing as the latter is being extruded, the articles being in spaced relation one to the other. There is thus produced a continuous chain of ensheathed closures comprising a continuous length of extruded tubing carrying a series of such rigid closures therein in spaced relation one to the other. The tubing may then be cut in any desired way between the spaced closures to give a series of collapsible tube blanks, each of which carries a closure element adherent to a length of extruded tubing at one end thereof while the other end of the extruded tubing is open. The open end of such tubing may then be sealed as by solvent action depending on the plastic employed, by heat, etc., to give a finished collapsible tube.

The tubing utilized may be produced from any desired thermoplastic material that may be extruded having the properties desired for this particular purpose and thermoplastic synthetic resinous materials are desirably employed including cellulose derivatives such as the esters and ethers for example, cellulose acetate, cellulose nitrate, cellulose acetate butyrate, ethyl cellulose, benzyl cellulose, etc.; vinyl polymers and copolymers including polymerized vinyl acetate, polymerized vinylidene chloride, and copolymers of vinyl chloride and vinyl acetate; polymerized styrenes, methacrylate and methyl methacrylate resins, acrylate and ethyl acrylate resins; polyethylenes; nylon type resins; etc. In addition, protein type materials that may be utilized for extrusion may also be employed. For the production of collapsible tubing of the most desirable type, the thermoplastic resinous material desirably employed is a plasticized vinyl or polyethylene material, giving a collapsible body portion which is readily pliable and utilizable for the purposes in hand.

The wall thickness of the extruded tubing depends on many considerations as the nature of the thermoplastic used, the material to be packaged, etc., but it is possible to use thin-walled tubing having a wall thickness, for example, of from .003 to .0035 inch, though no limit need be placed on wall thickness which will vary with the particular type of resin employed and the packaging being carried out.

By insertion of the closures intermittently within the tubing while the latter is being extruded and while still hot from the extrusion operation, conditions and materials may be chosen so that the closure is welded directly to the tubing at the point of contact to give a tight permanent sealed joint. The closures may be rigid from any desired material and may be a rigid plastic of synthetic resin type such as may be produced from methyl methacrylate, phenol formaldehyde resins, urea-formaldehyde resins, melamine resins, etc., or such closure may be of metal such as tin, aluminum, etc.

The tubing which is extruded and utilized may be of any desired cross-sectional shape such as round, rectangular, hexagonal, oval, etc., but generally will be of round cross-section.

Referring to Figure 1 of the drawings for illustrative apparatus that may be utilized in carrying out the present invention, there is shown an extrusion die 1 of the cross-head type through which the material 2 being extruded, is forced through the extrusion die orifice 3 about the core 4 to form the continuous, seamless, extruded tubing 5. The core may be held in place by means of the nut 6 threaded onto the threaded end 7 of the core. The core 4 is provided with a passage 8 that passes directly through the core desirably centrally positioned within the die body 1, which passageway opens into the interior of the tubing 5 as it is being extruded. The passage 8 is closed by a closure 8' which permits the intermittent feeding of the closures 9, 9, while retaining any air or other fluid pressure desired in and within the tubing 5 to prevent collapse thereof.

The closures 9, 9 are fed through the passage 8 at intervals as the tubing is being extruded so that the tubing 5 is formed directly about the closure 9 and a space 10 is present between the closures. Any desired means may be utilized for feeding the closures through the passageway into the tubing as it is being extruded.

If desired, depending on the speed of the operating conditions, the nature of the synthetic resinous material, etc., coolant 13 may be applied from the nozzle 14 as soon as the extruded material has adhered to the closure 9 at this point, the coolant thus being permitted to form a water screen where water is used as coolant, to set the resin and shrink it onto the closure 9. The air pressure within the tubing may be maintained by the valved air inlet 11 feeding to the passage 12 in the core which leads to a point within the tubing where it is first being formed about the closure 9.

The apparatus shown in Figure 1 may be set up to extrude tubing in a vertical position so that the closures 9 drop by gravity through the passageway 8 to a point where the tubing is leaving the extrusion die. As the tubing is formed by extrusion, the closure 9 will be seized by the tubing and carried along with it. The closures 9 in this event will be dropped into the passageway successively at spaced intervals.

A chain of closures at spaced intervals encased in the tubing 5 produced by the apparatus of Figure 1 may be taken off of that apparatus in the manner shown in Figure 2, the continuous chain of closures 9, 9 in the tubing 5 passing under wheel 15 onto the belt conveyor 16.

Any desired means may be utilized to cut the tubing carrying the encased closures to produce either an individual closure with attached tubing carrying the closure therein, or a chain of such articles.

As shown in Figure 3, the chain of closures 9, 9 adherent to the tubing 5 at spaced intervals is a continuous length of extruded tubing carrying such closures that may be utilized in the production of collapsible tubes. Each closure in such event will be of the general configuration shown having a discharge portion 17 provided with the usual aperture and threaded as shown at 18 for reception of a closure cap. Desirably the closure 9 has its side walls provided with grooves 19 into which the plastic of the tubing 5 sets as shown at 20 during the welding or adherence of the closure 9 to the tubing 5.

A chain of such sheathed closures as shown in Figure 3 may have the tubing cut either automatically or manually through the tubing at points 21, 21, to produce a single collapsible tube blank as shown in Figure 4 in which the extruded collapsible pliable thermoplastic tube 5 is open at one end 22 and at the other end carries the rigid closure 9 provided with the threaded dispensing end 17 as explained above, the closure 9 being rigidly attached to the tubing 5 at 20.

To form the finished collapsible tube from such collapsible tube blank, it is only necessary to seal the end 22 of the blank shown in Figure 4 to form a sealed end 23 as shown in Figure 5. Such sealing operation may take place by the application of solvents depending on the particular plastic employed, or by the application of heat as by applying heated platens to the end of such tubing, or the heating operation may be applied by electronic heating, while the ends 22 are in juxtaposition, or any other means for sealing the end of the tube may be employed. Any usual threaded cap may then be applied to the tube. The filling operations for introducing the material into the collapsible tube may take place as has heretofore been done in the prior art.

To simplify the cutting operations, the following practice may be followed. A closure end is utilized which has a sharp edge projecting laterally from the closure. As shown in Figure 7, the closure end 24 having the usual threaded neck 25 for receiving a cap (not shown) and grooved side walls 26 is provided with a sharp peripheral projection 27 desirably formed in the cap at the time of its manufacture. Such caps may be produced from polystyrene or other plastic as set forth above by injection molding or may be of metal die cast, etc. A series of such closures are passed intermittently into tubing during extrusion of the latter as explained above in producing the article of Figure 3. The resulting chain (Figure 8) of tubing carrying closures 24 is thus obtained. It may then be passed between steel rolls 29, 29 where pressure is exerted on the flexible plastic at the sharp edge or projection 27 to cut through the plastic and to produce the individual collapsible tube blank as shown in Figure 9, the predetermined length of tubing 28 being open at one end 30 and carrying the tube closure 24 at the other end. If desired the sharp edge 27 may be rolled down at the time of cutting or subsequently to round it off. The blank may then be used as set forth above for the blank of Figure 4.

In accordance with the present invention there may be readily produced collapsible tubes from extruded thermoplastic tubing, the collapsible tube consisting of an extruded collapsible pliable thermoplastic body portion having the rigid closure portion at one end and the opposite sealed end.

Having thus set forth my invention, I claim:

1. The method of making collapsible tubes which comprises extruding a heated thermoplastic resin in the form of a continuous thin-walled pliable tubing of the size desired for collapsible tubes, and inserting a discrete rigid closure end within the tubing after the latter has attained its tubular shape and as the tubing is being extruded and while still hot from the extruding operation the closure end being of such size that it is in intimate contact with the wall of the tubing so that the closure end is sealed to the tubing an unfilled portion of tubing extending beyond the closure end.

2. The method of making collapsible tubes which comprises extruding a heated thermoplastic resin in the form of a continuous thin-walled pliable tubing of the size desired for collapsible tubes, and inserting a series of discrete rigid closure ends intermittently within the tubing after the latter has attained its tubular shape and as the tubing is being extruded and while still hot from the extruding operation in such manner that the closures of the series are spaced from each other within the tubing, and rigidifying said tubing, said closures being of such size that each closure is in intimate contact with the wall of the tubing and sealed thereto, the closures being so spaced that an unfilled portion of tubing extends beyond each closure end.

3. The method of making collapsible tubes which comprises extruding a heated thermoplastic resin through a die in the form of a continuous thin-walled pliable tubing of the size desired for collapsible tubes, and passing a series of discrete rigid closure ends intermittently through the die into the extruded tubing after the latter has attained its tubular shape and as the tubing is being extruded and while still hot from the extruding operation in such manner that the closures of the series are spaced from each other within the tubing, and rigidifying said tubing, said closures being of such size that each closure is in intimate contact with the wall of the tubing and sealed thereto, the closures being so spaced that an unfilled portion of tubing extends beyond each closure end.

4. The method of making collapsible tubes as set forth in claim 2 including the step of cooling the tubing to rigidify the resin.

5. The method as set forth in claim 1, in which the tubing carrying the closure end is passed through a curtain of liquid coolant to rigidify the resin.

6. The method as set forth in claim 2, in which the tubing carrying the closure end is passed through a curtain of liquid coolant to rigidify the resin.

7. The method as set forth in claim 1, in which the tubing is cut through adjacent the closure end to form a collapsible tube blank having a closure end and an open end.

8. The method as set forth in claim 2, in which the tubing is cut through adjacent the closure end to form a collapsible tube blank having a closure end and an open end, and the open end is sealed.

9. The method of claim 1, in which the closure end carries a sharp peripheral projection protruding into the plastic.

10. The method of claim 1, in which the closure end carries a sharp peripheral projection protruding into the plastic and the extruded tubing carrying the closure is passed between rolls to exert pressure on the sharp peripheral projection to cut through the plastic and produce a collapsible tube blank.

CHARLES E. SLAUGHTER.

REFERENCES CITED

The following references are of record in the file of this patent:

UNITED STATES PATENTS

| Number | Name | Date |
|---|---|---|
| 862,475 | Haywood | Aug. 6, 1907 |
| 1,960,997 | Halloran | May 29, 1934 |
| 2,274,258 | Roselle | Feb. 24, 1942 |
| 2,413,323 | Hills | Dec. 31, 1946 |